United States Patent Office 3,097,895
Patented July 16, 1963

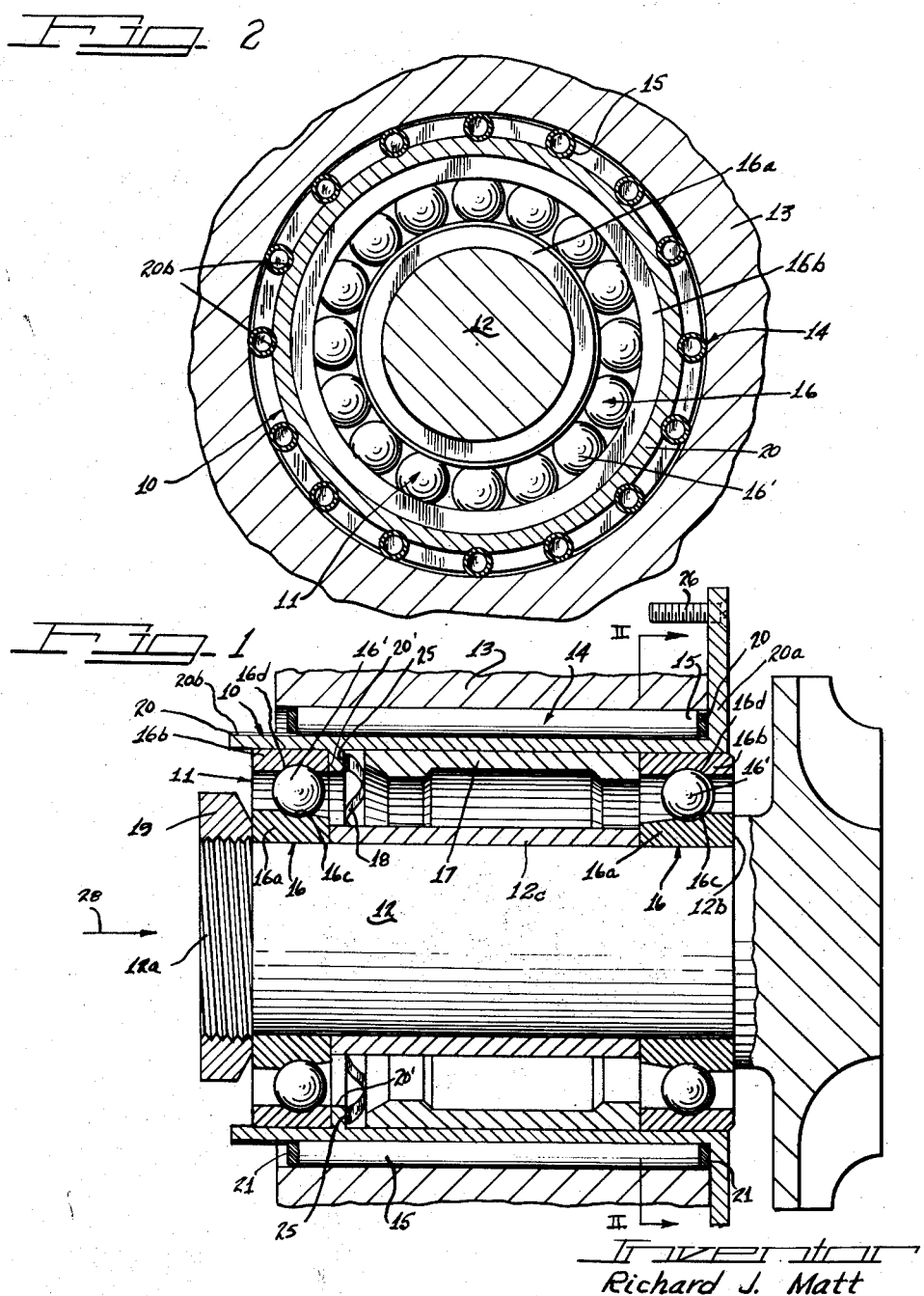

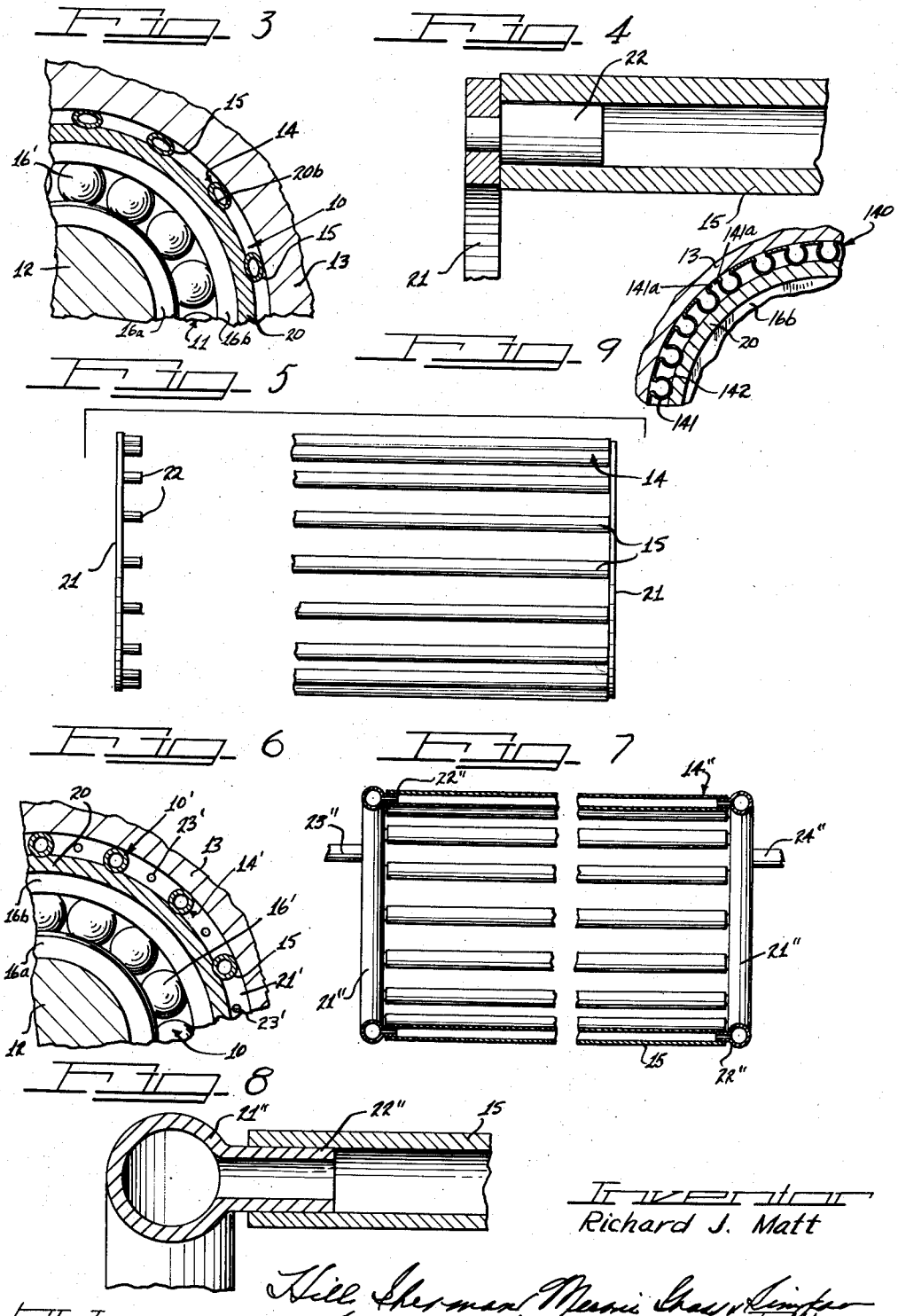

3,097,895
BEARING SUSPENSION
Richard J. Matt, South Euclid, Ohio, assignor to Thompson Ramo Wooldridge Inc., Cleveland, Ohio, a corporation of Ohio
Filed Nov. 10, 1960, Ser. No. 68,509
16 Claims. (Cl. 308—184)

The present invention relates generally to a bearing suspension for a turbine wheel and the like which is efficiently operative throughout a wide temperature range. In more specific terms, this invention relates to the use of resilient structural means between a housing and a bearing structure to dampen vibration, to reduce heat transfer, to compensate for differences in the coefficients of expansion of the housing and the bearing structure and for other purposes hereafter more fully explained.

With the advent of advanced flight vehicles operating at extreme high and low temperatures, the problem of flexible bearing suspension becomes more predominant. The trend is towards lighter weight vehicles and accessory equipment. Materials of various coefficients of expansion must be utilized in this equipment. The varying coefficients of expansion cause a considerable amount of trouble when proper clearances of rotary equipment must be maintained over a wide temperature range. Without this maintenance of running or operating clearance, proper operation of the bearing is impaired and, in many cases, failure can result. It is the intent of the suspension described in the following paragraphs to eliminate this major difficulty and to generally improve the operation of the bearing structure.

It has been found that if a bearing suspension which operates over wide temperature ranges is resiliently mounted, and this resilient mounting allows for differences in expansion rates, the reliability of rotating equipment may be increased. The present suspension is unique in the sense that by proper selection and tube configuration, variable rates of dampening and thermo expansion can be accommodated in an extremely small space. This is of particular importance where volume and weight of components are critical.

A standard suspension is one in which a part, similar to the herein disclosed bearing liner, is press fitted into the housing. Great care must be taken if the unit is to operate at low temperatures in the proper selection of the material. Generally, the bearing liner, bearings and shaft are some form of steel, while the housings are generally formed from some high expansion material, such as aluminum or magnesium. Since these lighter materials expand and contract at a faster rate than the normal bearing steels, on going to low temperatures, the housings will shrink and more tightly squeeze the bearing liners and subsequently the bearings themselves. If the bearing liner is relatively thick, then the aluminum or magnesium housing could be stressed to such a point as to exceed its yield level and, therefore, when the housing is returned to room temperature, the press fit would be destroyed due to the over stressing of the housing. When this same structure is then heated to a high temperature, the bearing liner would be loose in the housing and this could cause rotation of the liner, fretting corrosion, out of balance and possible failure of the unit.

It is not too difficult to match the coefficients of expansion of the shaft, the bearing spacer, the bearings, the sleeve, and the bearing retainer, but to relinguish the weight advantage of the housing to match expansion rates with the bearing suspension is highly undesirable and defeats attempts to produce lighter weight vehicles and accessory equipment.

According to the present invention, the different coefficients of expansion between the housing and the bearing unit can be compensated for without sacrificing either operating clearances or weight. This end is attained through the utilization of the resilient means disposed between the housing and the bearing unit. The resilient means may comprise solid or tubular rods and the like.

An important object of this invention is to provide a bearing suspension capable of maintaining proper clearances over a wider temperature range as compared to standard types of bearing suspensions.

Another object of this invention is to provide a resiliently mounted bearing suspension for maintaining proper clearances over a wider temperature range, for cutting down heat transfer for taking up of shock loads, and for dampening vibrations.

Still another object of this invention is to provide means for stress relieving a bearing unit from axial and radial load when the bearing unit is operated over a wider temperature range as compared to standard bearing units.

Still another object of the present invention is to provide a cooled bearing suspension for a turbine wheel and the like, for taking up shock loads, and for dampening vibrations.

Yet another object is to provide a new and improved bearing suspension which is superior to conventional bearing units in that it is more rugged and reliable when subjected to conditions which conventional bearing units cannot withstand and still function efficiently.

An important feature of the present invention concerns the provision of a series of peripherally spaced resilient rods about a bearing structure which rods may be coordinated with one another by means of retainer rings connected to the rods at the opposite ends thereof.

Still another feature of the present invention relates to the retainer ring and the resilient rods having coolant flowed through one of the rings and then along the length of the rods and then through the opposite ring.

Many other features, advantages and additional objects of the present invention will become manifest to those versed in the art upon making reference to the detailed description which follows and the accompanying sheet of drawings in which several preferred structural embodiments of an apparatus incorporating the principles of the present invention are shown by way of illustrative example.

On the drawings:
FIGURE 1 is a fragmentary vertical section through a bearing structure for suspending a turbine wheel in its housing;
FIGURE 2 is a fragmentary cross-sectional view taken substantially on the line II—II looking in direction indicated by the arrows, as seen in FIGURE 1;
FIGURE 3 is a fragmentary sectional view substantially identical to FIGURE 2 except that the resilient rods are shown in a compressed state;
FIGURE 4 is an enlarged, partially sectioned, detail view showing the relationship of a retainer ring with respect to a resilient tubular rod;
FIGURE 5 is an exploded view of certain components of the bearing suspension including the resilient rods and the retainer rings;
FIGURE 6 is a fragmentary cross-sectional view similar to FIGURE 2 only showing the bearing suspension provided with a fluid lubricating system;
FIGURE 7 is a fragmentary partially sectioned view of a modified retainer ring structure mounted on tubular resilient rods and having another type of fluid lubricating system;
FIGURE 8 is an enlarged fragmentary sectional view of a portion of the structure shown in FIGURE 7 showing the relationship of the retainer ring fingers with respect to one of the resilient tubular rods; and FIGURE 9 is an enlarged fragmentary cross-sectional view of a modified form of resilient suspension.

As shown on the drawings:

The present invention relates to a suspended bearing structure 10 including a bearing structure 11 adapted for disposition between a shaft 12 and a shaft housing 13 of a type having a higher coefficient of expansion than the bearing structure 11. According to the present invention, the suspended bearing structure 10 further includes a resilient bearing mounting 14 which retains its resiliency over a wide range of temperatures comprising a series of resiliently deformable rods 15 which rods 15 are supported by and spaced about the perimeter of the bearing structure 11 and are adapted for disposition between the shaft housing 13 and the bearing structure 11. The resiliently deformable rods 15 are deformable relative to the shaft housing 13 and the bearing structure 11 to compensate for differences in the rates of coefficient of expansion of the shaft housing 13 and the bearing structure 11 to insure the maintenance of proper clearance between the shaft housing 13 and the components of the bearing structure 11 over a wider temperature range as compared to a conventional bearing structure of this type not possessing the resilient bearing mounting 14. The resilient bearing mounting 14 including the rods 15 thus provide means for maintaining proper clearances over a wider temperature range, for cutting down heat transfer, for taking up shock loads, and for dampening vibrations.

The bearing structure 11, as illustrated, includes two identical axially spaced ball bearing units 16, 16 mounted on the shaft 12. These bearing units 16 are of the angular contact type and each include an inner race ring 16a, an outer race ring 16b, and a plurality of balls 16' between the race rings. The inner race ring 16a of each unit has an outer groove forming an outer raceway 16c on which the balls 16 ride while the outer race ring 16b has an internal groove providing the outer raceway 16d for the balls 16'. The arrangement is such that when the outer race rings 16b are urged axially away from each other, the balls 16' will be urged against opposite sides of the raceways 16c and 16d to take up any looseness between the inner race ring 16a and the outer race ring 16b. In this manner good bearing contact is always maintained between the balls 16' and their respective raceways 16c and 16d.

The outer or free end of the shaft 12 is threaded at 12a while the inboard end of the shaft has a radial shoulder 12b. A spacer sleeve 12c is disposed on the shaft between the inner race rings 16a of the bearings 16.

A spacer ring or sleeve 17 surrounds the sleeve 12c in spaced concentric relation between the outer race rings 16b of the bearing units and has one end thereof bottomed against an outer race ring 16b while the other end thereof is engaged by a wave spring ring 18 bottomed on a liner shoulder 25 of a sleeve or liner abutment 20'.

A nut 19 is threaded on the threaded end 12a of the shaft 12 to thrust against the inner race ring 16a of the adjacent bearing and to tighten the bearing unit on the shaft 12 with the spacer sleeve 12c being effective to bottom the other race ring 16a against the shoulder 12b. The bearing units 16 are thus held on the shaft 12 against axial movement relative to the shaft and if desired the inner race ring 16a of the bearing units can have a press fit relationship with the shaft 12.

With the inner race ring 16a of the bearing units 16 held against axial movement on the shaft 12, the wave spring 18 is effective to urge the outer race rings 16b away from each other thereby placing an axial load on the balls 16' and causing them to maintain good angular contact in their respective raceways 16c and 16d since the axial load on the outer race rings will force good bearing engagement between the balls and the inner sides of the outer race rings while at the same time effecting good bearing engagement between the balls and the outer sides of the inner raceways 16c. Of course, as temperature variations expand and contract the race rings 16a and 16b, the resiliency of the spring 18 will accommodate shifting of the outer race rings relative to the inner race rings and a substantially constant axial thrust can be maintained on the balls 16' regardless of temperature variations.

A liner ring or sleeve 20 surrounds the bearing unit 16, 16 and the spacer sleeve 17 in slidable relation with an outturned flange 20a at the end thereof. The outturned flange overlies the housing 13. The flange 20a is screwed to the housing 13 by screws 26.

At the outside diameter of the bearing liner 20 are a series of relatively small circumferentially or peripherally spaced grooved areas 20b which extend coaxially of the shaft and are spaced circumferentially relative to one another. The rods are engageable in the grooved areas 20b and it will be noted that each groove has about the same cross-sectional configuration as the area of the rod with which it is adapted to engage. The tubing or rods inserted within the grooved areas 20b may have various shapes and the illustrated tubing is circular in cross-section. The thickness of the tubing and its diameter is dependent upon the suspension stiffness desired and the differences in expansion which must be made over the operating range of the bearing structure 10. This configuration, consisting of bearing suspension and tubes, is press fitted a predetermined amount into the lightweight housing 13. Now, as thermo change takes place, these rods 15 absorb, by deforming, the differences in expansion, as shown in FIG. 3. They also serve the function of cutting down heat transfer, of taking up shock loads, and of dampening vibration. In situations where brittle bearings of glass or ceramic are utilized, a small amount of shock absorption is exceedingly advantageous. It should also be emphasized that this type of suspension can be useful for any type bearing mounting. The bearing need not be an anti-friction bearing. The bearing may be a journal bearing, an air bearing, and the like.

In order to facilitate the assembly of the rods 15 with the bearing unit 10, a pair of retainer rings 21 have been provided with fingers 22 for engagement within the tubular end portions of the rods 15. The fingers 22 are preferably loosely engaged within the bores of the tubular rods 15 or shaped to accommodate deformation of the rods under load as shown in FIGURE 3. The fingers if deformable may be formed in such a way as to generally conform with the internal configuration of the tubular rods 15. It will further be noted that the fingers 22 may be attached or formed integral with the ring 21, as desired.

If desired, the retainer ring 21 may be made from the same material as the resilient rods 15. It will be appreciated the selection of materials will depend on the operating temperature range of the structure that is to carry this suspended bearing unit 10. Two possible materials are AM350 and Inconel X. In the selection of the materials to be used it will be appreciated, however, that the rods must be resilient in character in order to be capable of compensating for the differences in the co-efficients of expansion of the shaft housing 13 and the bearing structure 11.

The suspension illustrated in FIGURE 1 is designed to take thrust in the direction indicated by arrow 23 in FIGURE 1. The suspension is not capable of taking thrust reversal as presently shown except if the space between the shoulder 25 and the adjacent shoulder of the sleeve 17 was such that the spring thickness subtracted from this cavity dimension equaled one-half of the end play of the bearing 16. Then, momentary thrust reversal could be accommodated.

In FIGURE 6 in shown a modified form of a suspended bearing unit 10'. The components of this unit are identical to those previously described except where primed numerals have been used. This modified suspended bearing unit 10 employs a modified type of resilient bearing mounting 14' including a retainer ring 21' and this retainer ring 21' has a series of annularly spaced fingers 22' which are adapted to fit within the tubular rods 15 in the same manner previously described above. The rings 21' are also equipped with coolant inlets 23' disposed between the fingers and one or more coolant outlets (not shown). Each of the retainer rings when in assembly are disposed in sealed relation with respect to the housing 13 and the bearing liner 20. This ring 21' as illustrated, has been sealed by press fitting the ring into assembly with the housing and the liner 20. Any suitable device may be employed to pump fluid through the ring 21' and the coolant inlet 23' and then axially between the fingers 22' and the tubes 15. After the coolant has flowed between the tubular resilient rods 15, the coolant then passes through one or more outlets on the ring 21' at the opposite end of the unit 10'. Any suitable liquid or gas could be used in this cooling system for cooling the suspended bearing unit 10' as well as the shaft 12 and the housing 13.

Shown in FIGURES 7 and 8 is still another modified resilient bearing mounting 14''. In this case, the resilient bearing mounting 14'' includes a retainer ring 21''. The retainer ring 21'' comprises an annular tube having a series of annularly spaced tubular fingers 22' which are adapted to snugly fit within the tubular rods 15. The rings 21'' are also equipped with a coolant inlet 23'' and a coolant outlet 24''. As described above, a pump may be used to promote the flow of fluid through the coolant inlet 23'', the annular tubular retainer ring 21'', the tubular fingers 22'', and then through the tubes 15. After the coolant has flowed through the tubular resilient rods 15, the coolant then passes through the tubular fingers 22'', on the annular retainer ring 21'' disposed at the opposite end of the unit and then out through the coolant outlet 24''. It will be appreciated the tubular fingers may be press fitted into the tubular rods 15.

In FIGURE 9 is illustrated a modified resilient bearing mounting 140. Except for the mounting, the other components of the suspended bearing structure are identical to the bearing structure 10 and the same reference numerals have again been used to identify the identical components.

The resilient bearing mounting 140 constitutes an annular ring 141 and is illustrated in FIGURE 9 as a split ring with the opposite ends being indicated generally at 141a. The ring 141 may be formed from a sheet of metal and provided with a series of corrugations along its length, as indicated at 142. The length of the sheet of corrugated material may be varied depending on the size of the bore. The corrugations or loops 142 should be of such a shape that during the operation of the unit, the corrugations will deform to compensate for the different stresses that the unit may be exposed to during operation. These corrugations or loops may be basically circular, elliptical, or diamond shaped in cross-section. The corrugations or loops 142 must be resiliently deformable.

It will be understood that modifications and variations may be effected without departing from the scope of the novel concepts of the present invention.

I claim as my invention:

1. A suspended bearing unit including a bearing structure adapted for disposition between a shaft and a shaft housing of a type having a higher coefficient of expansion than said bearing structure, and a resilient bearing mounting comprising a series of resiliently deformable rods supported by and spaced about the perimeter of the bearing structure adapted for disposition between a shaft housing and said bearing structure and which resiliently deformable rods are deformable relative to a shaft housing and said bearing structure to compensate for the differences in the rates of coefficients of expansion of a shaft housing and the bearing structure to insure the maintenance of proper clearances between a shaft housing and the components of said bearing structure over a wider temperature range as compared to a bearing structure of this type not possessing said variable temperature resilient bearing mounting, each of said rods being tubular and being joined together by a retainer ring, said ring having a series of generally axially extending fingers with said fingers being engaged within the tubular rods.

2. A suspended bearing unit including a bearing structure adapted for disposition between a shaft and a shaft housing, and a resilient bearing mounting comprising a series of resiliently deformable rods supported by and spaced about the perimeter of the bearing structure adapted for disposition between a shaft housing and said bearing structure and which resiliently deformable rods comprise means for cutting down heat transfer between said bearing structure and a shaft housing, for taking up shock loads, and for dampening vibration, and retainer rings disposed at opposite ends of said rods, each of said rings being attached to said rods.

3. The unit of claim 2 further characterized by each of said rods being tubular.

4. The unit of claim 2 further characterized by said rods and rings being tubular, and means connected to said tubular rings for flowing coolant therethrough.

5. The unit of claim 2 further characterized by said rings being tubular, and means connected with said tubular rings permitting coolant to flow through said tubular rings and between said rods to effect cooling of the unit.

6. In combination, a shaft housing and a rotatable shaft mounted in said shaft housing, a bearing structure having metal disposed therein and being disposed between said shaft and said shaft housing, the shaft housing being comprised of a lighter metal having a higher coefficient of expansion than said bearing structure, and a resilient bearing mounting comprising a series of spring metal rods spaced about the perimeter of the bearing structure and between the shaft housing and the bearing structure, said perimeter of the bearing structure having grooves partially receiving said rods, and said rods being deformable relative to the shaft housing and said bearing structure to compensate for the differences in the rates of coefficient of expansion of the shaft housing and the bearing structure to insure the maintenance of proper clearances between the shaft housing and the components of said bearing structure over a wide temperature range.

7. The combination of claim 6 further characterized by said spring metal rods being tubular and compressible into tubular non-circular shape to compensate for the said differences in the rates of coefficient of expansion.

8. In combination, a shaft housing and a rotatable shaft mounted in said shaft housing, a bearing structure having metal disposed therein and being disposed between said shaft and said shaft housing, the shaft housing being comprised of a lighter metal having a higher coefficient of expansion than said bearing structure, and a resilient bearing mounting comprising a series of spring metal tubes circumferentially spaced about the perimeter of the bearing structure between the shaft housing and the bearing structure, said tubes being deformable relative to the shaft housing and said bearing structure to compensate for the differences in the rates of coefficient of expansion of the shaft housing and the bearing structure to insure the maintenance of proper clearances between the shaft housing and the components of said bearing structure over a wide temperature range, a retainer ring at an end of the tubes, and said ring having a series of generally axially extending fingers engaged within the tubes.

9. In combination, a shaft housing and a rotatable shaft mounted in said shaft housing, a bearing structure having metal disposed therein and being disposed between said shaft and said shaft housing, the shaft housing being comprised of a lighter metal having a higher coefficient of expansion than said bearing structure, and a resilient bearing mounting comprising a series of resiliently deformable tubular rods spaced about the perimeter of the bearing structure and connected between the shaft housing and the bearing structure and which resiliently deformable rods are deformable relative to the shaft housing and said bearing structure to compensate for the differences in the rates of coefficient of expansion of the shaft housing and the bearing structure to insure the maintenance of proper clearances between the shaft housing and the components of said bearing structure over a wide temperature range, and means closing the opposite ends of said tubular rods including a ring joined at one end of said tubular rods having a fluid passageway in communication with rod fluid passageways in said rods for cooling the bearing structure.

10. A variable temperature resilient bearing mounting adapted for use between a shaft housing and a bearing structure, said resilient bearing mounting comprising a series of annularly arranged resiliently deformable rods and adapted to compensate for the differences in the rates of coefficients of expansion of a shaft housing and a bearing structure to insure the maintenance of proper clearances between the shaft housing and the components of said bearing structure over a wider temperature range as compared to a combination of this type not possessing said variable temperature resilient bearing mounting, and retainer rings disposed at opposite ends of said rods, each of said rings being secured to each of said rods to maintain the annular arrangement of said rods so that said rods comprise a rod sleeve with a bearing structure receivable internally of such a rod sleeve.

11. A variable temperature resilient bearing mounting adapted for use between a shaft housing and a bearing structure, said resilient bearing mounting comprising a a series of annularly arranged resiliently deformable rods and adapted to compensate for the differences in the rates of coefficients of expansion of a shaft housing and a bearing structure to insure the maintenance of proper clearances between the shaft housing and the components of said bearing structure over a wider temperature range as compared to a combination of this type not possessing said variable temperature resilient bearing mounting, and retainer rings disposed at opposite ends of said rods, each of said rings being secured to each of said rods to maintain the annular arrangement of said rods so that said rods comprise a rod sleeve with a bearing structure receivable internally of such a rod sleeve, each of said rods being tubular and with said retainer rings having a series of annularly spaced fingers disposed in tubular ends of said rods.

12. A variable temperature resilient bearing mounting adapted for use between a shaft housing and a bearing structure, said resilient bearing mounting comprising a series of annularly arranged resiliently deformable rods and adapted to compensate for the differences in the rates of coefficients of expansion of a shaft housing and a bearing structure to insure the maintenance of proper clearances between the shaft housing and the components of said bearing structure over a wider temperature range as compared to a combination of this type not possessing said variable temperature resilient bearing mounting, and retainer rings disposed at opposite ends of said rods, each of said rings being secured to each of said rods to maintain the annular arrangement of said rods so that said rods comprise a rod sleeve with a bearing structure receivable internally of such a rod sleeve, each of said rods being tubular and with said retainer rings having a series of annularly spaced fingers disposed in tubular ends of said rods, each of said annular retainer rings being tubular with one of them having a fluid inlet and with another of them having a fluid outlet whereby coolant may flow through the inlet and about the annular ring then through the tubular fingers and rods into the tubular fingers and annular tubular ring at an opposite end thereof and then through the fluid outlet.

13. A variable temperature resilient bearing mounting adapted for use between a shaft housing and a bearing structure, said resilient bearing mounting comprising a series of annularly arranged resiliently deformable rods and adapted to compensate for the differences in the rates of coefficients of expansion of a shaft housing and a bearing structure to insure the maintenance of proper clearances between the shaft housing and the components of said bearing structure over a wider temperature range as compared to a combination of this type not possessing said variable temperature resilient bearing mounting, retainer rings disposed at opposite ends of said rods, each of said rings being secured to each of said rods to maintain the annular arrangement of said rods so that said rods comprise a rod sleeve with a bearing structure receivable internally of such a rod sleeve, and means connected to said rings for assisting in the axial fluid flow of coolant along the length of said rods for cooling the bearing structure.

14. In combination, a shaft housing and a rotatable shaft mounted in said shaft housing, a bearing structure having metal disposed therein and being disposed between said shaft and said shaft housing, the shaft housing being comprised of a lighter metal having a higher coefficient of expansion than said bearing structure, said bearing structure including a pair of axially spaced ball bearing units and a spacer element and a spring axially between said units, said bearing structure further including a bearing liner containing said units, said spacer element and said spring, the bearing units each having a radially inner bearing race fixedly secured to said shaft and an axially outer bearing race slidably contained in said bearing liner, said bearing liner having an extension bearing against one of said bearing units and a nut secured to said shaft bearing against another of said units whereby the bearing units are urged towards one another and said spring functions to maintain the said units and said spacer element under axial load, and a variable temperature resilient bearing mounting connected between the shaft housing and the bearing liner and which resilient bearing mounting is deformable relative to the shaft housing and said bearing liner to compensate for the differences in the rates of coefficients of expansion of the shaft housing and the bearing structure to insure the maintenance of proper clearances between the shaft housing and the components of said bearing structure over a wider temperature range as compared to a combination of this type not possessing said variable temperature resilient bearing mounting, the resilient bearing mounting including a series of annularly arranged rods engaged between said liner and said housing and a pair of rings connected to said rods at opposite ends of said rods for securing said rods together and to facilitate the assembly of said rods with said bearing structure.

15. In combination, a shaft housing and a rotatable shaft mounted in said shaft housing, a bearing structure having metal disposed therein and being disposed between said shaft and said shaft housing, the shaft housing being comprised of a lighter metal having a higher coefficient of expansion than said bearing structure, said bearing structure including a pair of axially spaced ball bearing units and a spacer element and a spring axially between said units, said bearing structure further including a bearing liner containing said units, said spacer element and said spring, the bearing units each having a radially inner bearing race fixedly secured to said shaft and an axially outer bearing race slidably contained in said bearing liner, said bearing liner having an extension bearing against one of said bearing units and a nut secured to said shaft bearing against another of said units whereby the bearing units are urged towards one another and said spring functions to maintain the said units and said spacer element under axial load, and a variable temperature resilient bearing mounting connected between the shaft housing and the bearing liner and which resilient bearing mounting is deformable relative to the shaft housing and said bearing liner to compensate for the differences in the rates of coefficients of expansion of the shaft housing and the bearing structure to insure the maintenance of proper clearances between the shaft housing and the components of said bearing structure over a wider temperature range as compared to a combination of this type not possessing said variable temperature resilient bearing mounting, the resilient bearing mounting including a series of annularly arranged rods engaged between said liner and said housing and a pair of rings connected to said rods at opposite ends of said rods for securing said rods together and to facilitate the assembly of said rods with said bearing structure, said retainer rings having fingers and said retainer rings, said fingers and said rods all being tubular with the tubular fingers engaged in opposite ends of said rods securing said retainer rings in assembly with said rods, one of the tubular retainer rings having a coolant inlet and another of the tubular retainer rings having a coolant outlet, whereby coolant may pass through the coolant inlet into the tubular ring and fingers and then axially through the tubular rods and then through the tubular fingers and the tubular ring at the opposite end of said rods and then out through said coolant outlet.

16. In combination, a shaft housing and a rotatable shaft mounted in said shaft housing, a bearing structure having at least one metal component, said bearing structure being disposed between said shaft and said shaft housing, the shaft housing being comprised of a lighter metal having a higher coefficient of expansion than said bearing structure, a bearing mounting comprisng a series of spaced tubular resiliently compressible rods engaged radially between the shaft housing and the bearing structure, and means for holding the tubular resiliently compressible rods in spaced fixed positions between the shaft housing and the bearing structure, said resiliently compressible tubular rods being resiliently compressible into non-circular tubular form to compensate for differences in rates of coefficient of expansion of the shaft housing and the bearing structure to insure the maintenance of proper clearances between the shaft housing and the components of said bearing structure through a wide temperature range.

References Cited in the file of this patent

UNITED STATES PATENTS

| | | |
|---|---|---|
| 1,517,060 | Hanson | Nov. 25, 1924 |
| 2,114,670 | Searles | Apr. 19, 1938 |
| 2,119,990 | Hilton | June 7, 1938 |
| 2,504,776 | Woodfield et al. | Apr. 18, 1950 |
| 2,804,358 | Eriksson | Aug. 27, 1957 |
| 2,885,583 | Zunick et al. | May 5, 1959 |
| 2,926,051 | Cazier et al. | Feb. 23, 1960 |
| 2,992,868 | Vacha | July 18, 1961 |

FOREIGN PATENTS

| | | |
|---|---|---|
| 210,439 | Australia | June 20, 1957 |